(No Model.) 2 Sheets—Sheet 1.

P. J. EBERSOHL.
TURNING PLOW.

No. 488,880. Patented Dec. 27, 1892.

WITNESSES:
Chas. Nida.
C. Sedgwick.

INVENTOR:
P. J. Ebersohl
BY Munn & Co
ATTORNEYS (No Model.) 2 Sheets—Sheet 2.

P. J. EBERSOHL.
TURNING PLOW.

No. 488,880. Patented Dec. 27, 1892.

WITNESSES:
Chas. Nida.
C. Sedgwick

INVENTOR:
P. J. Ebersohl
BY
Munn & Co.
ATTORNEYS

UNITED STATES PATENT OFFICE.

PHILIP J. EBERSOHL, OF CENTREVILLE STATION, ILLINOIS.

TURNING-PLOW.

SPECIFICATION forming part of Letters Patent No. 488,880, dated December 27, 1892.

Application filed March 23, 1892. Serial No. 426,037. (No model.)

*To all whom it may concern:*

Be it known that I, PHILIP J. EBERSOHL, of Centreville Station, in the county of St. Clair and State of Illinois, have invented a new and useful Improvement in Turning-Plows, of which the following is a full, clear, and exact description.

My invention relates to turning plows, and has for its object to provide an attachment which may be expeditiously and conveniently applied to turning plows of ordinary construction, and which will effectually serve to turn weeds, stubble, corn stalks and the like under the soil; and a further object of the invention is to provide an attachment of the nature above described, capable of being adjusted to any desired position and of being lifted from the ground and from close proximity to the mold board when such operation is necessary.

Another object of the invention is to provide an attachment which will be not only simple and durable but also exceedingly economic.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
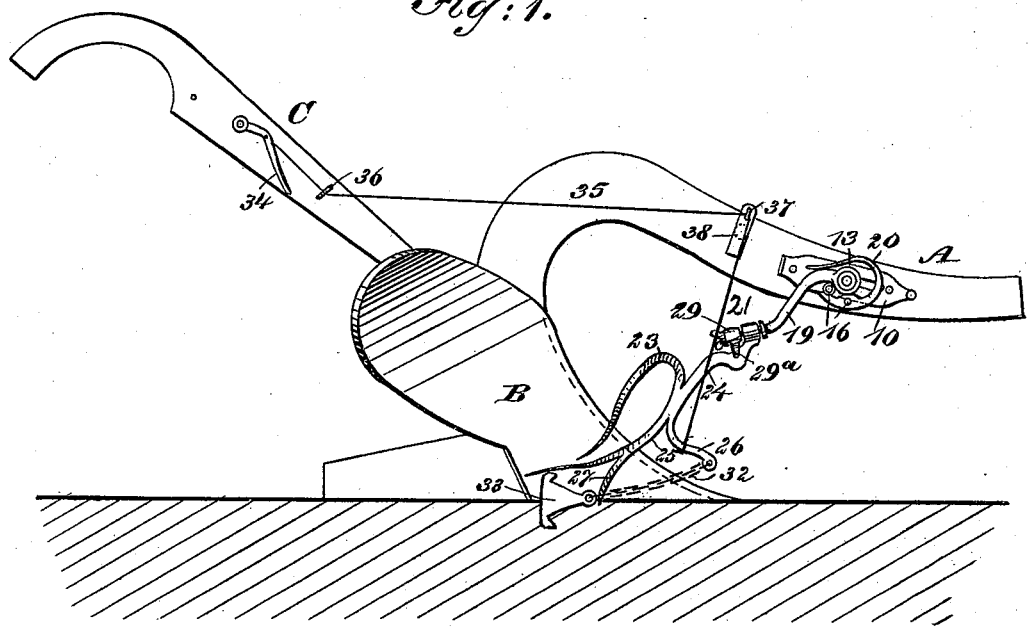
Figure 2:
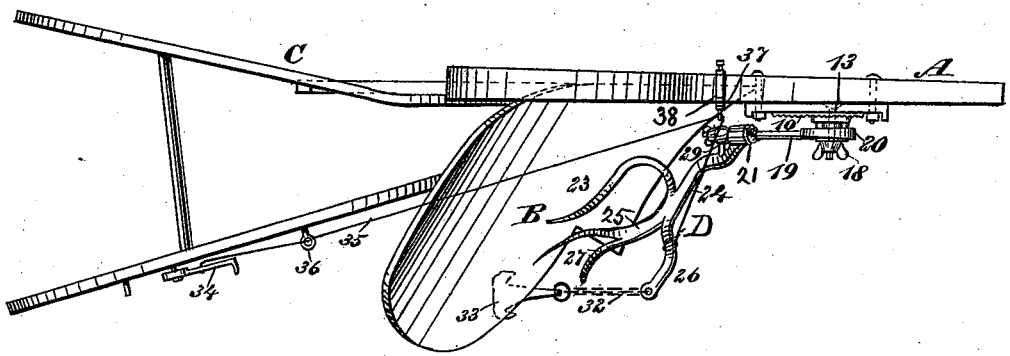
Figure 3:
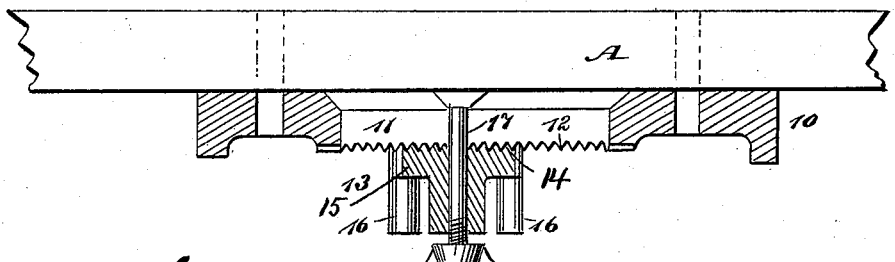
Figure 4:
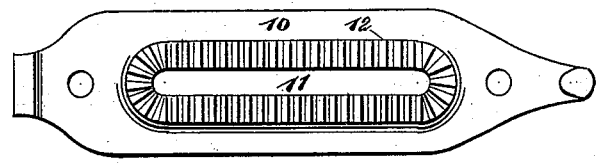
Figure 5:
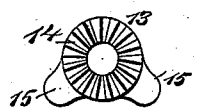
Figure 6:
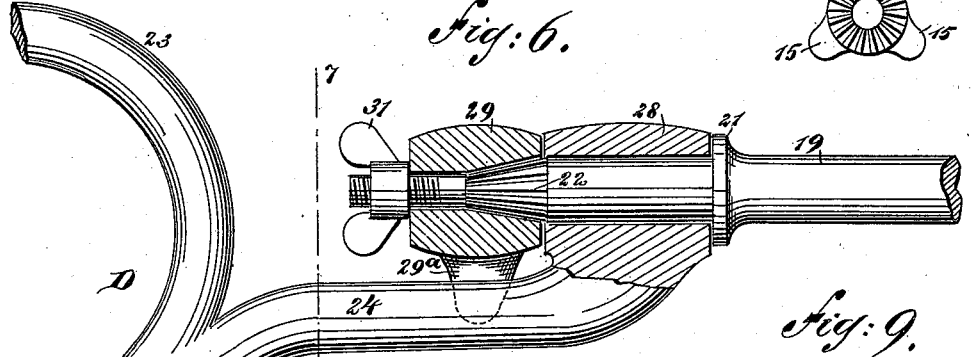
Figures 7, 8:
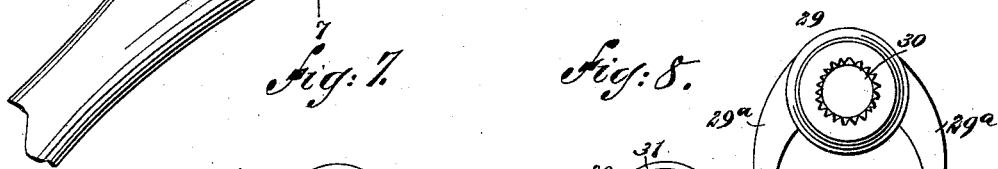
Figure 9:
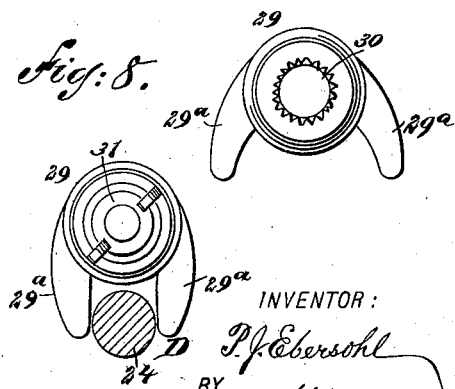

Figure 1 is a side elevation of a turning plow having the invention applied thereto; Fig. 2 is a plan view of the plow and the attachment; Fig. 3 is a plan view of a portion of the plow beam, illustrating the manner of attaching the device thereto, the device being in section; Fig. 4 is a plan view of the face plate to be attached to the beam; Fig. 5 is a bottom plan view of an adjusting nut used in connection with the face plate; Fig. 6 is a sectional view of the stop nut, a partial side elevation and sectional view of the turning fork, and a partial side elevation of the shaft to which the fork is attached; Fig. 7 is a section taken practically on the line 7—7 of Fig. 6; Fig. 8 is a section taken practically on the line 7—7 of Fig. 6 also, but illustrating a modified form of stop nut; and Fig. 9 is an end view of the stop nut shown in Fig. 7.

The plow illustrated in the drawings is the usual form of turning plow. The attachment is made to its beam A, and is held in front of the mold board B, the attachment being manipulated from the handles C. The face plate 10, is secured to the beam in any suitable or approved manner upon that side facing the mold board. The face plate, at its center, is slightly elevated, and is provided with a longitudinal slot 11, the surface upon the outer face of the plate around the slot being provided with teeth 12, as is best shown in Figs. 3 and 4. In connection with the face plate an adjusting nut 13, is employed. The under face of this adjusting nut is provided with teeth 14, as is best shown in Figs. 3 and 5, the teeth of the nut being adapted to engage with those of the face plate. The nut has a central bore, and from opposite sides lugs 15, are projected, and each of the said lugs carries a pin 16, which extends outward essentially flush with the outer face of the nut. The nut is held in adjustable engagement with the face plate by a bolt 17, which is passed through the opening 11 in the plate, and the head of the bolt is located between the inner surface of the plate and the contiguous surface of the plow beam. The bolt extends through the bore in the adjusting nut and beyond said nut, its outer end being threaded to receive a winged nut 18, or like device.

A shaft 19, adapted to carry and support the turning fork D, is pivoted upon the adjusting nut 13, the said shaft being provided with an eye at one end which fits over the adjusting nut, and it is held upon the nut by the thumb nut 18, as shown in Fig. 2. The shaft from its pivotal point is curved downward and at its lower end slightly upward, so that it partakes somewhat of the shape of the letter "S," as shown in Fig. 1. The upper curved portion of the shaft rests upon one of the pins 16, attached to the adjusting nut, and upon the other pin a spring 20, is pivoted, one end of which spring bears against the opposite pin 16, while the other end of the spring is curved above the adjusting nut and has a bearing upon the upper end of the shaft, as is best shown in Fig. 1. This spring serves to maintain the shaft normally in the downward position. Near its lower end the shaft is provided with a collar 21, as shown in Fig. 6. Its lower extremity is reduced and threaded, and between the lower threaded extremity and the collar the shaft is provided with a ribbed, conical surface 22.

The turning fork D is of peculiar construction, the fork being shaped somewhat as the letter X, and therefore it may be said to comprise two upper arms designated respectively as 23 and 24, and two lower arms 25 and 26. The rear upper arm is curved upward and thence downward and terminates somewhere near the center of the rear lower arm 25, and this member 25 is bifurcated at its lower end, as is illustrated at 27. One branch or tine of the lower member 25, is forwardly curved and the other is rearwardly curved. The upper member 24, is upwardly and forwardly curved, and this member is provided at its upper extremity with a sleeve 28, and the shaft 19, is passed through this sleeve until the collar 21, engages with it. It will thus be seen that the turning fork is free to swing upon the shaft, being loosely mounted thereon; but the movement of the fork is limited through the medium of a stop nut 29, one form of which is shown in Fig. 7 and in position in Fig. 6. This nut consists of a body portion and horns or wings 29$^a$, projected from opposite sides of the body. The body of the nut is provided with a bore through which the threaded end of the shaft passes; and the bore at the threaded end of the nut is enlarged, conically shaped, and provided with a series of ribs 30, as shown in Fig. 9, the said ribs being adapted to engage with the ribbed surface 22 of the shaft. Thus when the stop nut is placed in position upon the shaft, it serves first to prevent the turning fork from slipping off at the end of the shaft, and secondly, it serves the purpose of a stop limiting the lateral movement of the turning fork, as the upper member 24 of the fork passes between the wings 29$^a$ of the nut, and the fork can only swing the distance between the wings. The stop nut is prevented from leaving the shaft by securing upon the extremity of the latter a wing nut 31, or the equivalent thereof.

In Fig. 8 a slightly modified form of the wing nut is illustrated, in which the wings 29$^a$, are brought close together, so much so that the nut will hold the turning fork stationary.

The lower forward member 26 of the turning fork is curved upwardly and forwardly, and to it is attached a chain 32. This chain carries a drag 33, preferably made somewhat triangular in shape and provided at its back with hook-like projections, the drag being adapted to trail upon the ground in the furrow recently cut, forward of the mold board, and draw the weeds, stubble, or other rubbish forward in the furrows that they may be turned under.

The lower body portion of the turning fork holds the loose weeds and stubble that the colter connected with the plow beam has cut, and forces said weeds and stubble down under the furrow. The member 26 in front of the fork draws the tall weeds that fall across the furrow forward into it. The bifurcated extremities or prongs 27 of the member 25, hold the short weeds on the edge of the furrow that escape from the drag, and the rear long member 23 holds the loose weeds and stubble down and forces them under the furrow slice, and also hold the weeds down on the upper side of the furrow slice while the rear prong of the member 25 holds them down on the lower side. The earth in being turned over will pull all the stubble or other trash that might accumulate around the drag from it, so that there is no danger of the drag becoming clogged. When it is desired to raise the fork and the drag, as in turning the plow, for instance, this is accomplished through the medium of a lever 34, fulcrumed upon one of the handles C of the plow; and this lever is connected by means of a cable or small chain 35 with the member 26 of the fork, the cable or chain passing through an eye 36, or other guide, located upon the handle, and also through an eye 37, or equivalent guide attached to a yoke 38, which yoke is detachably secured upon the plow beam.

The member 26 of the turning fork may be dispensed with in some styles of plows, as for instance, in riding plows where the wheel comes close to the mold board. In this event the drag is also unnecessary as the wheel prevents the weeds falling across the furrow. When the member 26 of the fork is dispensed with the chain or cable 35 may be secured to the fork shaft 19. When the chain or cable is attached to the fork member 26, upon lifting the lever 34, the turning fork will turn upward revolving on its turning point on the shaft 19 as far as the guard on the stop nut will permit, describing about one-fourth of a revolution; and will at that time be in nearly a vertical position. The plow may now be thrown down on its furrow or mold board side and dragged along without bending or breaking the fork. Upon raising the plow to an upright position and throwing down the lever, the weight of the drag suspended from the arm 26 will cause the turning fork to swing back to its proper position.

Having thus described my invention, I claim as new, and desire to secure by Letters Patent,—

1. A weed turning attachment for plows, consisting in a vertically swinging shaft 19 pivoted at its forward end to an attaching plate adapted to be secured to the beam, a laterally swinging fork having an eye pivoting on the rear end of the shaft, and stops carried by the shaft in rear of said eye and between which the fork shank or arm 24 swings, substantially as set forth.

2. An attachment for turning plows, consisting of a shaft adjustably attached to a face plate, a spring having a bearing upon the shaft, a turning fork carried by the shaft, a stop mechanism regulating the lateral movement of the fork, and a drag connected with the fork, substantially as and for the purpose specified.

3. An attachment for turning plows, consisting of a shaft, a face plate, an adjustable connection between the face plate and the shaft, a spring attached to the face plate and having a constant bearing upon the shaft, a turning fork loosely mounted upon the shaft and held in suspension thereby, a stop nut located upon the shaft and controlling the lateral movement of the fork, and a drag having a link connection with one member of the fork, as and for the purpose specified.

4. A weeding attachment, comprising the vertically yielding shaft 19, having a collar 21, teeth or serrations 22, and a threaded rear extremity, a fork having an eye 28 on the shaft between the collar and teeth or serrations, a stop nut on the toothed part of the shaft, and a nut on the shaft in rear of the nut, substantially as set forth.

5. A weeding attachment, comprising an attaching plate 10, a laterally projecting nut or bearing longitudinally adjustable thereon and provided with lugs 16, 16, a vertically yielding shaft 19 mounted at its forward end on the nut and resting on the rear lug, a spring secured upon the other lug and curved upward and rearward and bearing at its free end on the upper side of the said shaft, and a turning fork carried by the rear end of the said shaft, substantially as set forth.

6. The combination, with a turning plow, and a shaft adjustably attached to the plow beam, of a turning fork carried by the shaft, a stop device controlling the lateral movement of the shaft, a drag attached to the turning fork, a lift lever, and a connection between the lift lever and the fork, whereby the fork and the drag may be elevated, as and for the purpose set forth.

7. A weeding attachment, comprising the bent shaft 19, a bearing nut 13, on which the front end of the shaft pivots, a lug on the nut limiting the downward movement of the shaft, a spring carried by the nut and bearing down on the shaft, a longitudinally slotted attaching plate, a bolt extending through the slot and nut and provided with a binding nut for securing the nut 13 in position on the plate and also securing the shaft on the nut 13, a collar 21 on the rear end of the shaft, a stop nut 29 on the shaft in rear of the collar and having depending lugs 29$^a$, a binding nut securing the stop nut in place, and a laterally swinging fork pivoting on the shaft between the said collar and stop nut, substantially as set forth.

PHILIP J. EBERSOHL.

Witnesses:
 CHARLES EBERSOHL,
 WILHELM EBERSOHL, Jr.